United States Patent [19]
Scheps

[11] Patent Number: 5,200,972
[45] Date of Patent: Apr. 6, 1993

[54] ND LASER WITH CO-DOPED ION(S) PUMPED BY VISIBLE LASER DIODES

[75] Inventor: Richard Scheps, Del Mar, Calif.

[73] Assignee: The United States of America as represented by the Secretary of the Navy, Washington, D.C.

[21] Appl. No.: 718,316

[22] Filed: Jun. 17, 1991

[51] Int. Cl.$^5$ ............................................. H01S 3/09
[52] U.S. Cl. ................................. 372/69; 372/68; 372/41; 372/71; 372/75
[58] Field of Search ................. 372/69, 70, 39, 41, 372/71, 75, 68

[56] References Cited

U.S. PATENT DOCUMENTS

4,740,975  4/1988  Abrahams et al. .................. 372/41
5,090,019  2/1992  Scheps ................................ 372/69

Primary Examiner—Léon Scott, Jr.
Attorney, Agent, or Firm—Harvey Fendelman; Thomas Glenn Keough

[57] ABSTRACT

The 1.06$\mu$ Nd transition in a co-doped Cr,Nd:Gd$_3$Sc$_2$Ga$_3$O$_{12}$ (Cr,Nd:GSGG) gain element is obtained by diode pumping Cr$^{3+}$ at 670 nm and produces efficient, low threshold laser operation. Although co-doped Cr,Nd:GSGG was developed for more efficient flashlamp pumping, it has the desirable property of having an extraordinarily broad absorption to allow for efficient diode pumping relative to the Nd:YAG laser. The consequent broad bandwidth tolerance of the Cr,Nd:GSGG for the diode pumping radiation allows diode pumping of the 1.06$\mu$ transition without regard to the wavelength of the visible diodes which has the potential for reducing the cost of the semiconductor pump and also demonstrates the extended versatility of these diodes which previously had been restricted to pump the Cr$^{3+}$ tunable vibronic lasers. CW and long pulse diode pumping provided pump power levels as high as 300 mW cw and 1 W pulsed. The lowest threshold power was measured at 938 $\mu$W and the highest output power was obtained at 43 mW cw and 173 mW pulsed. The best slope efficiency obtained was 42.1%, 78% of the theoretical maximum. Loss measurements indicate a value of 0.4%/cm.

4 Claims, 2 Drawing Sheets

ND LASER WITH CO-DOPED ION(S) PUMPED BY VISIBLE LASER DIODES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Laser diode pumping of Nd:YAG lasers is well recognized for producing high efficiency, low threshold devices. Unfortunately, it is difficult and expensive to fabricate laser diode arrays with the proper power, bandwidth and center wavelengths to be useful for pumping Nd laser materials. In addition, usually the pumping diodes themselves are typically made of AlGaAs semiconductor material, and, therefore, have a naturally broad wavelength range over which they can operate. Another consideration is that accurate thermal control of the pumping diode junction temperature is required for efficient operation of the Nd:YAG laser due to the narrow absorption bandwidth at 808 nm. Such control is a cumbersome design constraint and adds complexity to the overall system. The narrow absorption line width also increases the difficulty of modeling both the inversion profile resulting from volumetric deposition of the polychromatic pump excitation, and the effects of anticipated spectral shifts in the pump source due to aging, see for example the article of R. Scheps and J. F. Myers, "Performance and Aging of a High Power 2-D Laser Diode Array", Appl. Opt, Vol. 29 (1990), p. 341.

With respect to using diode arrays as the pumping source, the additional aspect of the variation in the central wavelength and bandwidth from stripe to stripe must be considered. From a pragmatic viewpoint, the specification requiring a high power narrow band diode pumping array increases the cost of the semiconductor pump. Because in practice the diode pumping array is often the single most expensive component in the laser head, the total costs can easily become prohibitive. To address this issue, hosts for the Nd ion have been sought in which the width of the 800 nm absorption is increased. Two examples of such host materials are Nd:BEL, (see the article by R. Scheps et al., "End Pumped Nd:BEL Laser Performance" in *Opt. Eng.*, Vol. 27 [1988], p. 830) and Nd:YVO$_4$ (see the article of R. A. Fields et al., "750 mW, 1.06µm, cw TEM$_{oo}$ Output from a Nd:YVO$_4$ Laser End Pumped by a Single 20 Stripe Diode Array" in *Advances in Laser Science-III*, American Institute of Physics Conference Proceedings, Atlantic City, NJ, Vol. 172 [1987], pp. 20–22) which both have been diode pumped and have a significantly broader absorption bandwidth than Nd:YAG.

Thus, there is a continuing need in the state of the art for an efficient Nd-doped laser material that can be diode pumped but is far less sensitive to the exact wavelength and bandwidth of the pump diodes than are the previously demonstrated Nd-doped laser materials.

SUMMARY OF THE INVENTION

The present invention is directed to providing a co-doped Cr,Nd:Gd$_3$Sc$_2$Ga$_3$O$_{12}$, (Cr,Nd:GSGG) gain element that assures a 1.06 µ Nd transition by diode pumping Cr$^{3+}$ by visible light diodes between 610 and 680 nm to produce efficient low threshold laser operation.

A method for providing emitted laser radiation from a co-doped Cr,Nd:GSGG gain element relies on visible light diode pumping Cr$^{3+}$ at 670 nm for a 1.06 µ Nd transition to produce efficient low threshold laser operation.

An object of the invention is to provide an Nd-doped laser material that is co-doped to assure less sensitivity to the wavelength of the diodes to allow more efficient operation.

Another object is to provide for a co-doped laser material having an operational wavelength range to accommodate the pumping diode assuring an improved match between pump emission and laser material absorption.

Still another object is to provide for a co-doped laser material capable of being pumped by visible red laser diodes (which are not particularly efficient for pumping laser materials doped only with Nd) to pump the co-doped laser material with an ion that broadly absorbs the red diode emission and efficiently transfers its excitation to the Nd ion within the same laser material.

Another object is to provide a co-doped Cr,Nd:Gd$_3$Sc$_2$Ga$_3$O$_{12}$ (Cr,Nd:GSGG) laser material in which the 1.06 µ Nd transition is obtained by diode pumping Cr$^{3+}$ at 670 nm to produce efficient low threshold laser operation.

Another object is to provide a method for providing emitted laser radiation from pumping a co-doped (Cr,Nd:GSGG) gain element via diode pumping.

These and other objects of the invention will become more readily apparent from the ensuing specification and drawings when taken in conjunction with the appended claims.

DESCRIPTION OF THE PREFERRED EMBODIMENT

Figure 1:
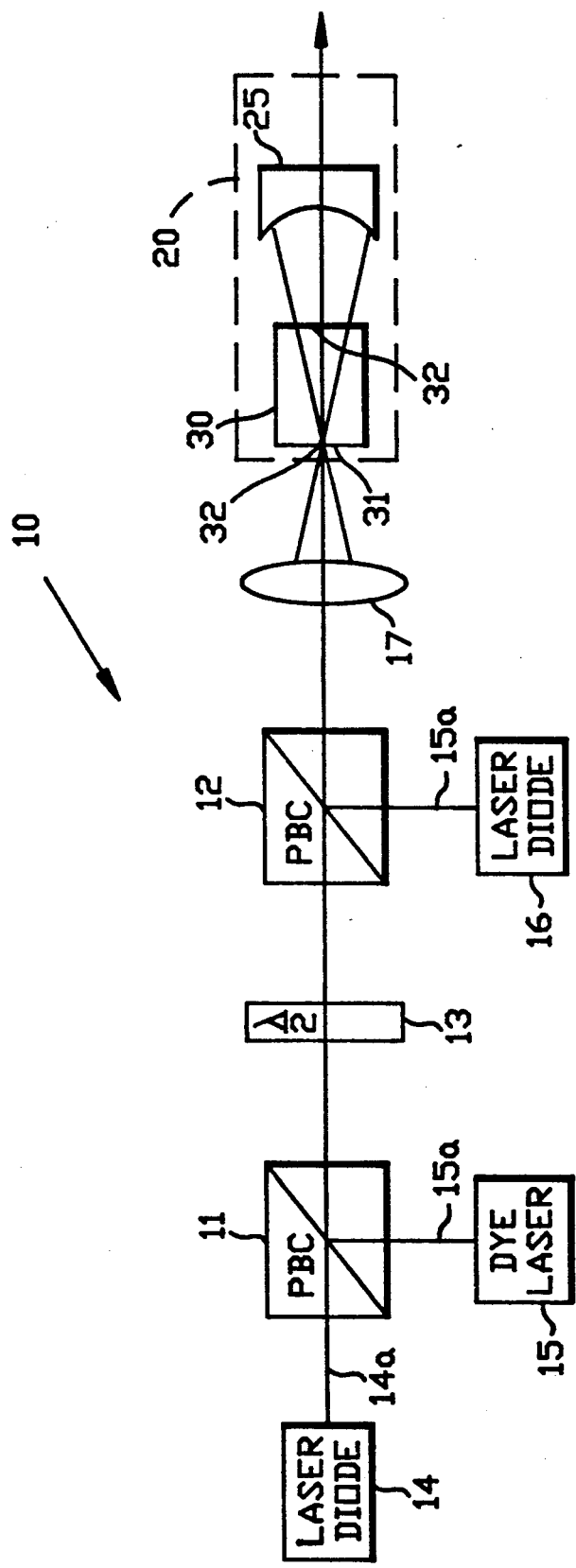
FIG. 1 depicts a schematic representation of the principal constituents of this inventive concept with the configuration of the pump and resonator objects optics; two polarizing beam combiner cubes (PBC) are used to allow three optical sources to simultaneously pump the Cr,Nd:Gd$_3$Sc$_2$Ga$_3$O$_{12}$,(Cr,Nd:GSGG) gain element; the $\lambda$2 plate rotates the polarization of the two sources transmitted by PBC 11, determining the fraction of each transmitted by PCB 12.

Referring now to FIG. 1 of the drawings, co-doped Cr,Nd:Gd$_3$Sc$_2$Ga$_3$O$_{12}$ (Cr,Nd:GSGG) originally was developed to enhance the coupling of flashlamp excitation to the Nd $^4$F$_{3/2}$ Nd upper laser level, see A. A. Kaminski et al's "Luminescence and Stimulated Emission of Nd$^{3+}$ Ions in Gd$_3$Sc$_2$Ga$_3$O$_{12}$ Crystals", *Phys. Status Solidi* (a), 34 K109 (1976). The enhanced coupling is accomplished by means of the broad absorption of the Cr$^{3+}$ ion in the visible and the rapid and efficient excitation transfer between the $^4$T$_2$ state of Cr$^{3+}$ and the $^4F_{3/2}$ Nd level. An additional excitation transfer process occurs through absorption of the $Cr^{3+}$ $^4T_2 \rightarrow {}^4A_2$ fluorescence by the Nd ion.

In accordance with this inventive concept excitation transfer is useful for diode pumping as well, as it provides an alternate channel for populating the upper laser level of Nd using the broad absorption band centered at 640 nm. With the proven pumping of Cr,Nd:GSGG using low power, single mode commercial laser diodes and higher power, multi-mode diodes being established, pumping with visible laser diodes of moderate power now available from commercial suppliers, the viability of this approach assures greater promise. Although visible diodes are primarily of interest for pumping $Cr^{3+}$ doped tunable solid state lasers, the generation of efficient 1.06 $\mu$ Nd emission by these devices is an important demonstration of their versatility.

A representative pump geometry of FIG. 1 is a modified version of a standard polarization combination laser pump configuration 10, such as described in the last article of R. Scheps et al. that is cited above, which is used extensively to longitudinally pump Nd lasers. Two polarization beam combiner (PBC) cubes 11 and 12 are used in conjunction with a $\lambda/2$ plate 13, allowing up to three optical sources 14, 15 and 16 to simultaneously pump a co-doped Cr,Nd:GSGG laser rod 30 of a resonator 20. One pump axis 15a was dedicated to an argon ion-pumped dye laser of source 15 which was used for resonator characterization measurements to be reported below.

Two 10 mW, single mode laser diodes were combined and positioned as sources 14 and 16, as shown in FIG. 1 and were operated at 672 and 673 nm, respectively. Cooling the diodes was not required for thermal management or for control of the output wavelength. Higher output laser performance was achieved by pumping with a multi-mode laser diode such as a commercially available GaInP/AlGaInP diode.

Two variations of these devices were used. The first operated at a maximum power level of 100 mW cw, 265 mW long pulse ("quasi-cw"). The coherence properties of this diode were comparable to that of a commercial diode, producing similar pump thresholds and a focused spot size. The second device had a significantly wider stripe and generated up to 300 mW cw and 1 W long pulse. For this laser the focussed spot size and threshold were degraded relative to the single mode diodes. Active cooling for thermal management was not required for either multi-mode diodes, and, at full power, a heatsink, not shown, was maintained at approximately 21° C. When used to pump laser rod 30, one of the high power diodes replaced a 10 mW diode laser while the other 10 mW diode was replaced with an alignment helium-neon laser.

Resonator 20 consisted of 6.25 mm diameter, 5 mm long, Cr,Nd:GSGG rod 30 and either a 5 or 10 cm radius of curvature (ROC) output coupler 25 in a nearly hemispherical configuration. The exterior facet 31 of rod 30 was coated for high reflectivity (HR) at 1.06 $\mu$ and high transmission (HT) at 670 nm, while the interior facet 32 was anti-reflection (AR) coated for 1.06 $\mu$. The pump light was focused at 32 which is at or near exterior face (or facet) of rod 30 with a 50 mm focal length lens 17.

Two different $Cr^{3+}$ densities were used in the laser materials of Cr,Nd:GSGG rod 30. The Cr,Nd:GSGG rod providing the better results contained $2 \times 10^{20}$ ions/cm$^3$ of both $Cr^{3+}$ and $Nd^{3+}$. The data set out below are primarily for this rod. The second rod had the same dimensions as the first and the same Nd density ion density, but the $Cr^{3+}$ ion density was $1 \times 10^{20}$ ions/cm$^3$.

At this time it must be pointed out, however, that these given relative densities are for the purpose of demonstration and are not to be construed as limiting this invention to only these figures. One skilled in the art to which this invention pertains, having these teachings in mind, would feel free to vary the densities or the crystal host, such as using Cr,Nd:GSAG or Cr,Nd:YSAG, for examples, as well as the pumping source selections and arrangements of the constituents to accommodate a particular application or to maximize a realization of the salient features of this inventive concept.

The absorption spectra of the uncoated rods 20 displayed sharp $Nd^{3+}$ lines superimposed on two broad $Cr^{3+}$ visible absorption bands. The spectral features are identical to those contained in D. Pruss et al's., "Efficient $Cr^{3+}$ Sensitized $Nd^{3+}$ GdScGa-Garnet Laser at 1.06$\mu$m", appearing in *Appl. Phys* B, Vol. 28 (1982), p. 355. The absorption was independent of pump polarization. The measured absorption was used to calculate the absorbed pump power for both threshold and slope efficiency measurements. At 670 nm, the absorption coefficient was 2.1 cm$^{-1}$ and 4.3 cm$^{-1}$ for the low and high $Cr^{3+}$ doped rods, respectively. The power incident upon the rod was reduced by the transmission of the dichroic coating at 670 nm, which was measured to be 0.977.

A remarkable feature of the Cr,Nd:GSGG rods 20 is the extraordinarily low measured threshold power. Using a 10 cm ROC HR output coupler 25, the absorbed power required to reach threshold was 938 $\mu$W and 985 $\mu$W for the high and low $Cr^{3+}$ doped rods, respectively. The threshold power was low enough so that laser emission was obtained when using a 1 mW helium-neon alignment laser along axis 14a at 632.8 nm to pump rod 30. These measured threshold powers compare quite favorably with the value of 7 mW in the D. Pruss et al. article cited above, in which longitudinal pumping of Cr,Nd:GSGG used a Kr$^+$ laser at 647 nm. Threshold powers as low as 2.3 mW have been reported for a diode-pumped Nd:YAG monolithic resonator, see B. Zhou et al's., "Efficient Frequency -Stable Laser-Diode-Pumped Nd:YAG Laser", *Opt. Lett*, 10, 62 (1985), and 1 mW for a miniature "microchip" laser, see J. J. Zayhowski and A. Mooradian's "Frequency-Modulated Nd:YAG Microchip Lasers", *Opt. Lett.* 14, 24 (1989). The comparison to Nd:YAG gives qualitative credence to the notion that the internal loss of Cr,Nd:GSGG rod 30 is as good as high quality Nd:YAG since the threshold power $P_{th}$ depends directly on the resonator loss, see the article by R. Scheps, J. F. Myers and S. A. Payne, "CW and Q-Switched Operation of a Low Threshold $Cr^{3+}$:LiCaAlF$_6$ Laser", *IEEE Photonics Tech. Lett*, 2, 626(1990):

$$P_{th} = \frac{\pi(w_p^2 + w_r^2)\hbar\omega(\Sigma L)}{4\sigma\tau} \quad (1)$$

where $\hbar\omega$ is the pump photon energy, $\Sigma L$ represents the sum of all intracavity (double pass) losses and includes the output coupling, $w_p$ and $w_r$ are the pump and resonator waists, respectively, $\sigma$ is the stimulated emission cross section, and $\tau$ is the fluorescence lifetime. For Cr,Nd:GSGG $\sigma$ is $1.3 \times 10^{-19} cm^2$ and $\tau$ is 242 $\mu s$.

The losses in Cr,Nd:GSGG rod 30 were measured directly using two different techniques. The first measured the relaxation oscillation frequency, which is related, as developed in the article by K. Kubodera et al.,"Stable LiNdP$_4$O$_{12}$ Miniature Laser", *Appl. Opt.* 18, 884, (1979) to the cavity losses by $$L = (2\pi f_r)^2 \frac{2\tau(n_1 l_1 + n_2 l_2)}{P_e c} \quad (2)$$

where L represents the round trip cavity losses including the output coupling, $P_e = (P - P_{th})/P_{th}$ is the excess pump power, P is the absorbed pump power, $n_1$ and $n_2$ are the refractive indices of Cr,Nd:GSGG (1.949) and air, respectively, $l_1$ and $l_2$ are the path lengths through the rod and air, respectively, c is the speed of light, and $f_r$ is the relaxation oscillation frequency. With an excess pump power $P_e$ of 14.6 and a 5 cm ROC output coupler 25, the oscillation frequency was measured to be 177 kHz, giving a value of $7.49 \times 10^{-3}$ for the losses. The transmission of the output coupler and dichroic coating were measured as $1.93 \times 10^{-3}$ and $1.2 \times 10^{-3}$, respectively, resulting in the round trip internal resonator loss of $4.4 \times 10^{-3}$. Using this loss in Eq. (1), above, along with the measured pump waist of 5 $\mu$ and the resonator waist of 45 $\mu$ (calculated from the beam divergence), the calculated threshold power is 1.1 mW, in good agreement with the measured value. Resonator 20 losses were also calculated from the dependence of the threshold power on output coupling, please refer to D. Findlay et al's., "The Measurement of Internal Losses in 4-Level Lasers", *Phys. Lett.*, Vol. 20 (1966), p. 277.

Figure 2:
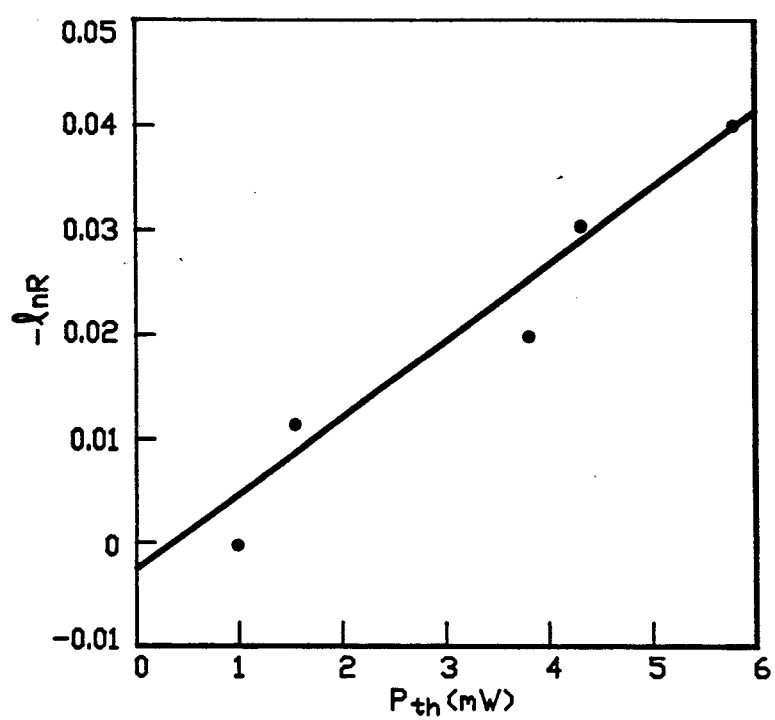
FIG. 2 shows a plot of linear regression fit to data showing the variation of the absorbed threshold power with output coupler reflectivity.

The data were obtained with dye laser pumping are shown in FIG. 2. The fit by linear regression yields a round trip loss of $3.7 \times 10^{-3}$ and a slope (equal to the round trip gain) of $7.8 \times 10^{-3}$ mW$^{-1}$. The two values for the resonator loss are in reasonable agreement, giving single pass loss values of 0.44%/cm and 0.37%/cm for the relaxation oscillation and Findlay-Clay methods, respectively. Note that the reflectivity of the AR coating is included in the residual loss.

The variation of the threshold power with pump wavelength was measured with the dye laser over the range of 610 to 680 nm using a 5 cm ROC HR (99.81%R) output coupler 25 and was found to remain constant at $1.32 \pm 0.16$ mW. The laser output was monitored for temporal spiking under dye laser excitation. This phenomenon had been observed when using the dye laser to pump other Cr$^{3+}$ doped materials, see the last R. Scheps article above, but was not observed in a typical crystal operated in accordance with this inventive concept. The slope efficiency was measured for several different output couplers. The best slope efficiency was 42.1%, obtained with a 97%R output coupler. This is in good agreement with the value obtained with ion laser pumping.

Figure 3:
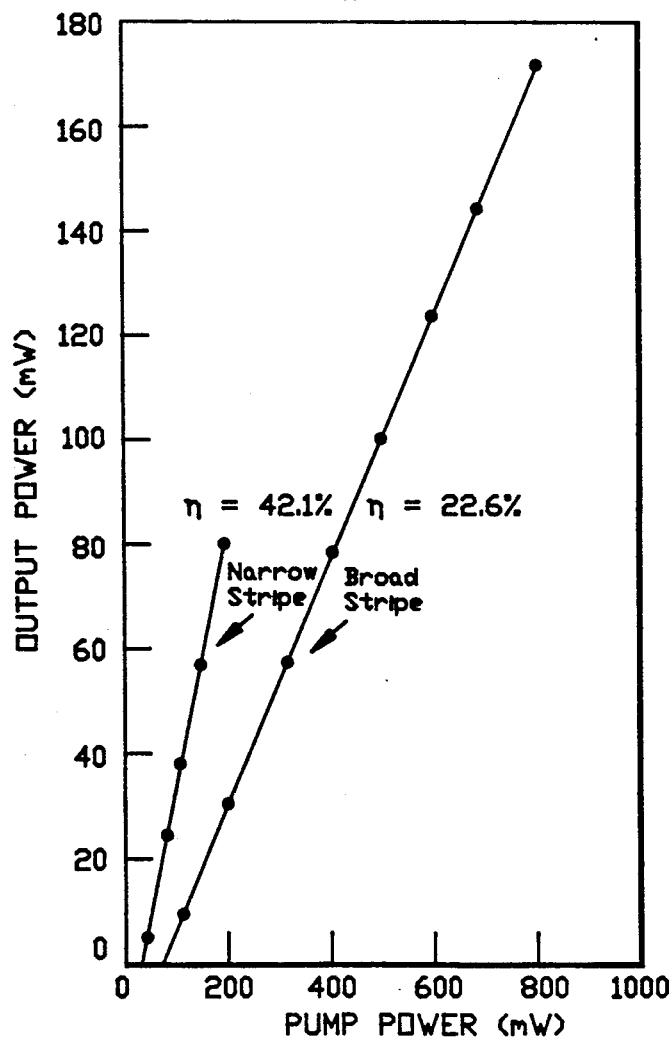
FIG. 3 shows laser output power versus absorbed pump power for Cr,Nd:GSGG shown for the narrow and broad striped multimode diodes; pulsed data is plotted; cw data is coincident with the pulsed up to maximum cw pumped power limit; the data were obtained with a 97% R output coupler, and the slope efficiency is indicated.

It should be noted that the resonator and pump waists which produce the lowest measured threshold are not identical to those that produce the highest slope efficiency. For this reason, the 10 mW laser diodes could not be used with the 97% mirror, as the absorbed threshold power in the high slope configuration was 29.6 mW. Using the narrow stripe multi-mode diode at maximum power, 22.2 mW cw and 79.4 mW pulsed were obtained. The pulse length used was 500 $\mu s$ at a pulse repetition rate of 20 Hz. For long pulse excitation the laser output pulse initially consisted of damped relaxation oscillations which decayed to a dc signal after approximately 50 $\mu s$. Diode pumping with the wider stripe multi-mode diode produced a slope efficiency of 22.6%, a threshold power of 57.6 mW, and maximum output powers of 42.8 mW cw and 173.0 mW long pulse, see FIG. 3.

To determine if thermal effects were degrading the output power, the cw power was monitored as a function of time and the pulsed output was monitored while varying the pump duty cycle and pulse width. For the pump power densities applied herein no output power degradation was observed.

It is to be noted that the quantum defect, the ratio of pump to output photon energy, is 0.63 for the 1.06 $\mu$ transition in Cr,Nd:GSGG compared with 0.76 for the same transition in Nd:YAG pumped by 808 nm diodes. This additional thermal loading will impact the design of a high power diode pumped Cr,Nd:GSGG laser. However, some of these issues have been successfully approached in designing diode pumped 1.3 $\mu$ Nd:YAG lasers, for which the quantum defect is 0.61. Dividing the slope efficiency measured for Cr,Nd:GSGG by the quantum defect gives a photon slope efficiency of 66.8%. By further factoring out the efficiency for Cr to Nd excitation transfer which has been found to be 0.86, the resulting slope efficiency is as high as that in reported in the article by R. Scheps, "Efficient Laser Diode Pumped Nd Lasers", *Appl. Opt.*, 28, 89 (1989), for end-pumped Nd:YAG. The maximum slope efficiency for Cr,Nd:GSGG is 54.2%.

Cr,Nd:GSGG pumped by visible diodes has been shown to perform as well as the best diode pumped Nd:YAG lasers in terms of threshold, output power and internal loss. The slope efficiency is lower due to the lower quantum defect and the non-unity excitation transfer efficiency from Cr to Nd. The measured threshold power is among the lowest reported for any diode pumped material to date, low enough to allow pumping with a 1 mW helium-neon alignment laser. While the co-doped Cr,Nd:GSGG was developed for more efficient flashlamp pumping, it has the desirable property of having an extraordinarily broad absorption for diode pumping relative to Nd:YAG. The consequent broad bandwidth tolerance for the diode array reduces the costs of the semiconductor pump, allowing for the widespread use of this invention. Moreover, in diode pumping the 1.06 $\mu$ transition with the visible diodes (which had previously been used solely to pump the Cr$^{3+}$ tunable vibronic lasers) an extended versatility of these diodes has been demonstrated to further reduce costs by extended production techniques.

Again, it must be emphasized that these given relative densities are for the purpose of demonstration of this inventive concept and are not to be construed in a sense of limitation to only the specific illustrative figures.

Obviously, many modifications and variations of the present invention are possible in the light of the above teachings. It is therefore to be understood that within the scope of the appended claims, the invention may be practiced otherwise than as specifically described.

I claim:

1. A laser apparatus for producing a 1.06 $\mu$ Nd transition therein comprising:
   a co-doped Cr,Nd:GSGG laser material and an output coupler forming a resonator; and at least one laser diode pumping $Cr^{3+}$ of said co-doped Cr,Nd:GSGG laser material between 610 and 680 nm to effect said 1.06 μ Nd transition in said Cr,Nd:GSGG, in which said pumping is at levels up to 300 mW cw with lowest threshold power measured at least 938 μW and highest output power of 43 mW cw.

2. A laser apparatus for producing a 1.06 μ Nd transition therein comprising:

a co-doped Cr,Nd:GSGG laser material and an ouptu coupler forming a resonator; and at least one laser diode pumping $Cr^{3+}$ of said co-doped Cr,Nd:GSGG laser material between 610 and 680 nm to effect said 1.06 μ Nd transition in said Cr,Nd:GSGG, in which said pumping is at levels up to 1 W pulsed with lowest threshold power measured at least 938 μW and highest output power of 173 mW pulsed.

3. A laser apparatus for producing a 1.06 μ Nd transition therein comprising:

a co-doped Cr,Nd:GSGG laser material and an output coupler forming a resonator; and at least on laser diode pumping $Cr^{3+}$ of said co-doped Cr,Nd:GSGG laser material between 610 and 680 nm to effect said 1.06 μ Nd transition in said Cr,Nd:GSGG, in which said laser diode is at 670 nm to effect said 1.06 μ Nd transition in said Cr,Nd:GSGG and in which said pumping is at levels up to 300 mW cw with lowest threshold power measured at least 938 μW and highest output power of 43 mW cw.

4. A laser apparatus for producing a 1.06 μ Nd transition therein comprising:

a co-doped Cr,Nd:GSGG laser material and an output coupler forming a resonator; and at least one laser diode pumping $Cr^{3+}$ of said co-doped Cr,Nd:GSGG laser material between 610 and 680 nm to effect said 1.06 μ Nd transition in said Cr,Nd:GSGG, in which said laser diode is at 670 nm to effect said 1.06 μ Nd transition in said Cr,Nd:GSGG and in which said pumping is at levels up to 1 W pulsed with lowest threshold power measured at least 938 μW and highest output power of 173 mW pulsed.

* * * * *